US011416823B2

(12) United States Patent
Malhotra et al.

(10) Patent No.: US 11,416,823 B2
(45) Date of Patent: Aug. 16, 2022

(54) RESOLUTION AND PIPELINING OF HELPDESK TICKETS NEEDING RESOLUTIONS FROM MULTIPLE GROUPS

(71) Applicant: KYNDRYL, INC., New York, NY (US)

(72) Inventors: Nikhil Malhotra, Bangalore (IN); Atri Mandal, Bangalore (IN); Giriprasad Sridhara, Bangalore (IN); Vijay Ekambaram, Chennai (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 16/451,485

(22) Filed: Jun. 25, 2019

(65) Prior Publication Data

US 2020/0410450 A1    Dec. 31, 2020

(51) Int. Cl.
| | | |
|---|---|---|
| G06Q 30/00 | (2012.01) | |
| G06N 99/00 | (2019.01) | |
| G06F 11/07 | (2006.01) | |
| G06Q 10/06 | (2012.01) | |
| G06F 3/0482 | (2013.01) | |
| G06Q 10/10 | (2012.01) | |
| G06F 40/30 | (2020.01) | |
| G06F 40/205 | (2020.01) | |

(52) U.S. Cl.
CPC ......... G06Q 10/107 (2013.01); G06F 40/205 (2020.01); G06F 40/30 (2020.01); G06Q 10/063112 (2013.01)

(58) Field of Classification Search
CPC .......... G06Q 10/107; G06Q 10/063112; G06F 40/205; G06F 40/30
USPC ........................................................ 709/206
See application file for complete search history.

(56) References Cited

U.S. PATENT DOCUMENTS

| | | | |
|---|---|---|---|
| 8,135,612 | B1 | 3/2012 | Scudder |
| 8,458,323 | B1 * | 6/2013 | Baader, II ............... H04L 41/22 709/224 |
| 8,473,432 | B2 | 6/2013 | Anerousis et al. |
| 8,838,701 | B2 | 9/2014 | Galgali et al. |
| 9,710,459 | B2 | 7/2017 | Baldwin et al. |
| 10,402,765 | B1 * | 9/2019 | Lushear ............... G06Q 30/016 |
| 2012/0290662 | A1 | 11/2012 | Weber et al. |
| 2014/0119531 | A1 * | 5/2014 | Tuchman ............ H04L 12/1813 379/265.09 |

(Continued)

OTHER PUBLICATIONS

"Automatic analysis and remediation of dynamic perturbations in resolver classes for retrospective learning and assignment of email tickets"; An IP.com Prior Art Database Technical Disclosure; IP.com No. IPCOM000254356D; Jun. 2018.

(Continued)

*Primary Examiner* — Kevin T Bates
*Assistant Examiner* — Golam Mahmud
(74) *Attorney, Agent, or Firm* — Tutunjian & Bitetto, P.C.; Erik Swanson (57) ABSTRACT

A help desk management system uses segment partitioning and matching of each identified segment to a suitable problem and resolver group and then sequencing the partitioned segments based on sentiment analysis and sequence mining on historical tickets and audit logs to actuate effective resolution and pipelining of helpdesk tickets needing resolutions from multiple resolver groups. The helpdesk tickets can be in the form of e-mails.

15 Claims, 6 Drawing Sheets

(56) References Cited

U.S. PATENT DOCUMENTS

| | | | |
|---|---|---|---|
| 2014/0325254 A1* | 10/2014 | Mani | G06F 11/0793 |
| | | | 707/738 |
| 2015/0278748 A1* | 10/2015 | Anderson | G06Q 30/016 |
| | | | 705/7.14 |
| 2015/0346918 A1* | 12/2015 | Bodda | G06Q 10/06313 |
| | | | 715/825 |
| 2016/0110723 A1 | 4/2016 | Shimpi et al. | |
| 2017/0068963 A1* | 3/2017 | Saxena | G06Q 30/016 |
| 2017/0178145 A1* | 6/2017 | Adrian | G06F 16/9535 |
| 2017/0180219 A1* | 6/2017 | Abu | G06F 16/24575 |
| 2018/0108022 A1* | 4/2018 | Bandera | G06Q 10/06316 |
| 2018/0197072 A1* | 7/2018 | Hausler | G06F 16/35 |
| 2018/0211260 A1* | 7/2018 | Zhang | G06N 20/00 |
| 2018/0253487 A1* | 9/2018 | Carteri | G06Q 30/016 |
| 2018/0253736 A1* | 9/2018 | Rajaram | G06Q 30/016 |
| 2018/0315055 A1* | 11/2018 | Pickover | H04L 9/3297 |
| 2018/0365700 A1* | 12/2018 | Walthers | G06F 16/24578 |
| 2019/0139054 A1* | 5/2019 | Mathrubootham | G06Q 30/016 |
| 2019/0347282 A1* | 11/2019 | Cai | G06K 9/6215 |
| 2019/0361760 A1* | 11/2019 | Krishnan | G06F 11/076 |
| 2020/0082005 A1* | 3/2020 | Lloyd | G06F 16/2379 |
| 2020/0394273 A1* | 12/2020 | Trim | G06N 5/025 |

OTHER PUBLICATIONS

Wang et al. "Real-time Change Point Detection using On-line Topic Models"; Proceedings of the 27th International Conference on Computational Linguistics, pp. 2505-2515; Aug. 2018.

* cited by examiner

RESOLUTION AND PIPELINING OF HELPDESK TICKETS NEEDING RESOLUTIONS FROM MULTIPLE GROUPS

BACKGROUND

The present invention relates to help desk software and resolution of helpdesk tickets, and more specifically to resolution and pipelining of helpdesk tickets needing resolutions from multiple groups.

Standard computer-aided engineering (CAE) systems of helpdesk software are used to automate customer services and includes helpdesk ticket management, automation and reporting/optimization.

Helpdesk ticket analytics are determined by standard CAE systems to predict a single class from a pool of resolver groups or classes which can be used for resolution of the helpdesk ticket. Traditional CAE systems cannot automatically assign to multiple groups for these tickets and often the first group is wrongly assigned by such systems, resulting in back and forth email exchanges with a user in order to achieve any sort of resolution. At each handoff there are multiple email exchanges resulting in delayed resolution.

A considerable number, for example more than 5% of overall of helpdesk tickets, require resolution by multiple groups. For a helpdesk receiving 30,000 emails per month this can translates to approximately 1500 tickets.

Helpdesk tickets associated with e-mails that contain multiple problems which require multiple resolutions are difficult for conventional CAE systems to learn from these e-mails contain different problems and cannot be classified in a single class from a pool or to resolver groups. Furthermore, since traditional CAE systems classify the problems within the helpdesk ticket e-mail into classes based on identified classifiers, the number of classifiers in which the CAE system needs to be trained in is exponential (e.g. $2^N$ with N being the number of resolver groups) and the CAE systems cannot scale appropriately. Classification can also be difficult, as a first problem in the helpdesk e-mail is explicitly mentioned in the helpdesk ticket and at least a second problem is implicit within the e-mail. The order in which in the problems need to be resolved can also be difficult to determine by the conventional CAE system. Therefore, using such helpdesk e-mails for training of a traditional CAE system causes confusion, and results in a decrease of prediction accuracy with all of the classes the problems within the e-mail in which the problems are classified into.

SUMMARY

According to one embodiment of the present invention, a method of resolving helpdesk ticket messages requiring resolutions from multiple resolver groups is disclosed. The method comprising the steps of: identifying problem entities from within text of a helpdesk ticket message received from a user; identifying topics within the identified problem entities from within the text of the helpdesk ticket message; parsing the text of the helpdesk ticket message into subsections based on the identified topics; assigning each subsection to a single relevant resolver group; determining a priority of the identified topics of the problem entities; and based on the priority of the identified topics of the problem entities, sending the helpdesk ticket to the single relevant resolver group associated with the identified topic with a highest priority.

According to another embodiment of the present invention, a computer program product for resolving helpdesk ticket messages requiring resolutions from multiple resolver groups by a computer. The computer comprising at least one processor, one or more memories, one or more computer readable storage media, the computer program product comprising a computer readable storage medium having program instructions embodied therewith. The program instructions executable by the computer to perform a method comprising: identifying, by the computer, problem entities from within text of a helpdesk ticket message received from a user; identifying, by the computer, topics within the identified problem entities from within the text of the helpdesk ticket message; parsing, by the computer, the text of the helpdesk ticket message into subsections based on the identified topics; assigning, by the computer, each subsection to a single relevant resolver group; determining, by the computer, a priority of the identified topics of the problem entities; and based on the priority of the identified topics of the problem entities, sending, by the computer, the helpdesk ticket to the single relevant resolver group associated with the identified topic with a highest priority.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure, consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
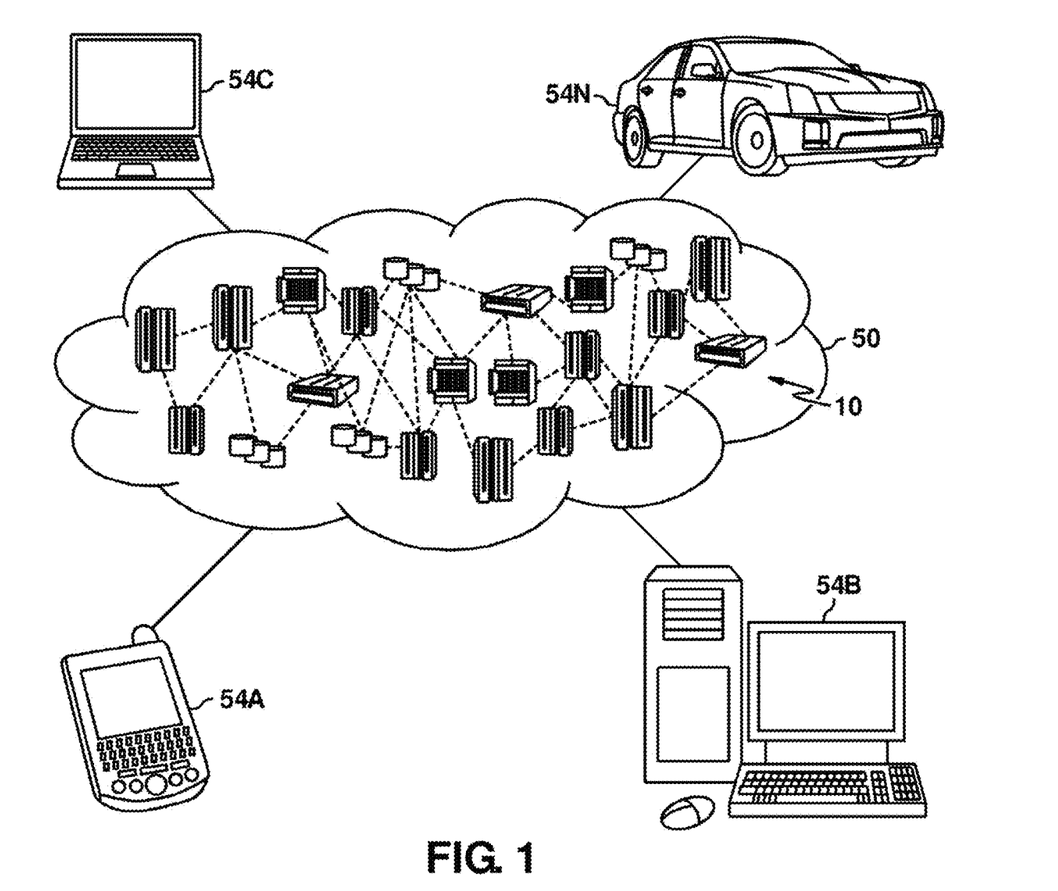
FIG. 1 depicts a cloud computing node according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
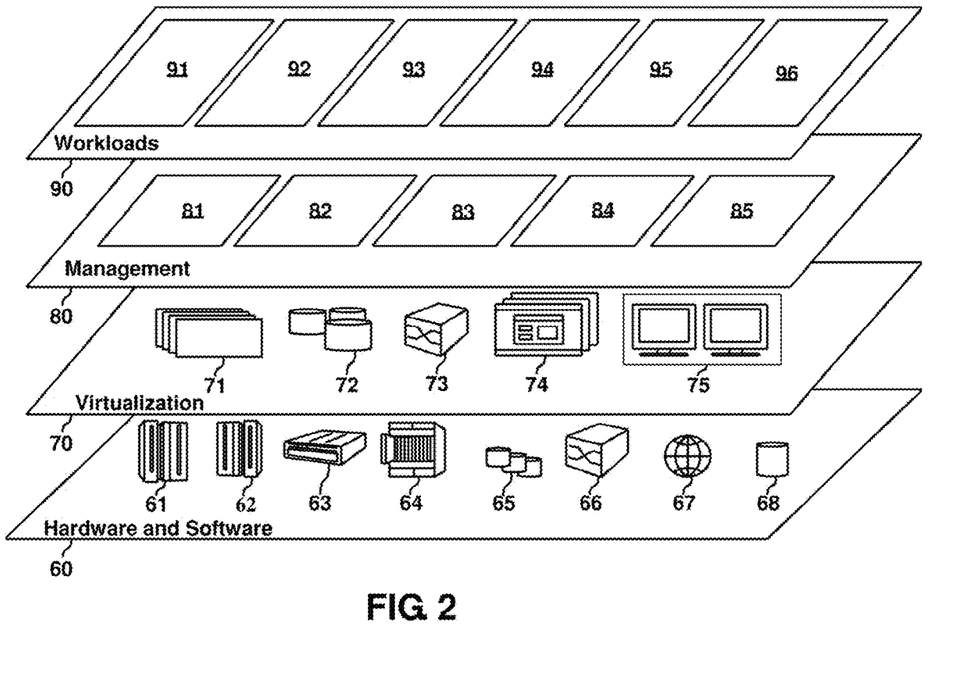
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and helpdesk ticket management 96.

In an embodiment of the present invention, helpdesk ticket management 96 uses segment partitioning and matching of each identified segment to a suitable problem and resolver group and then sequencing the partitioned segments based on sentiment analysis and sequence mining on historical tickets and audit logs to actuate effective resolution and pipelining of helpdesk tickets needing resolutions from multiple resolver groups. The helpdesk tickets can be in the form of e-mails.

Figure 3:
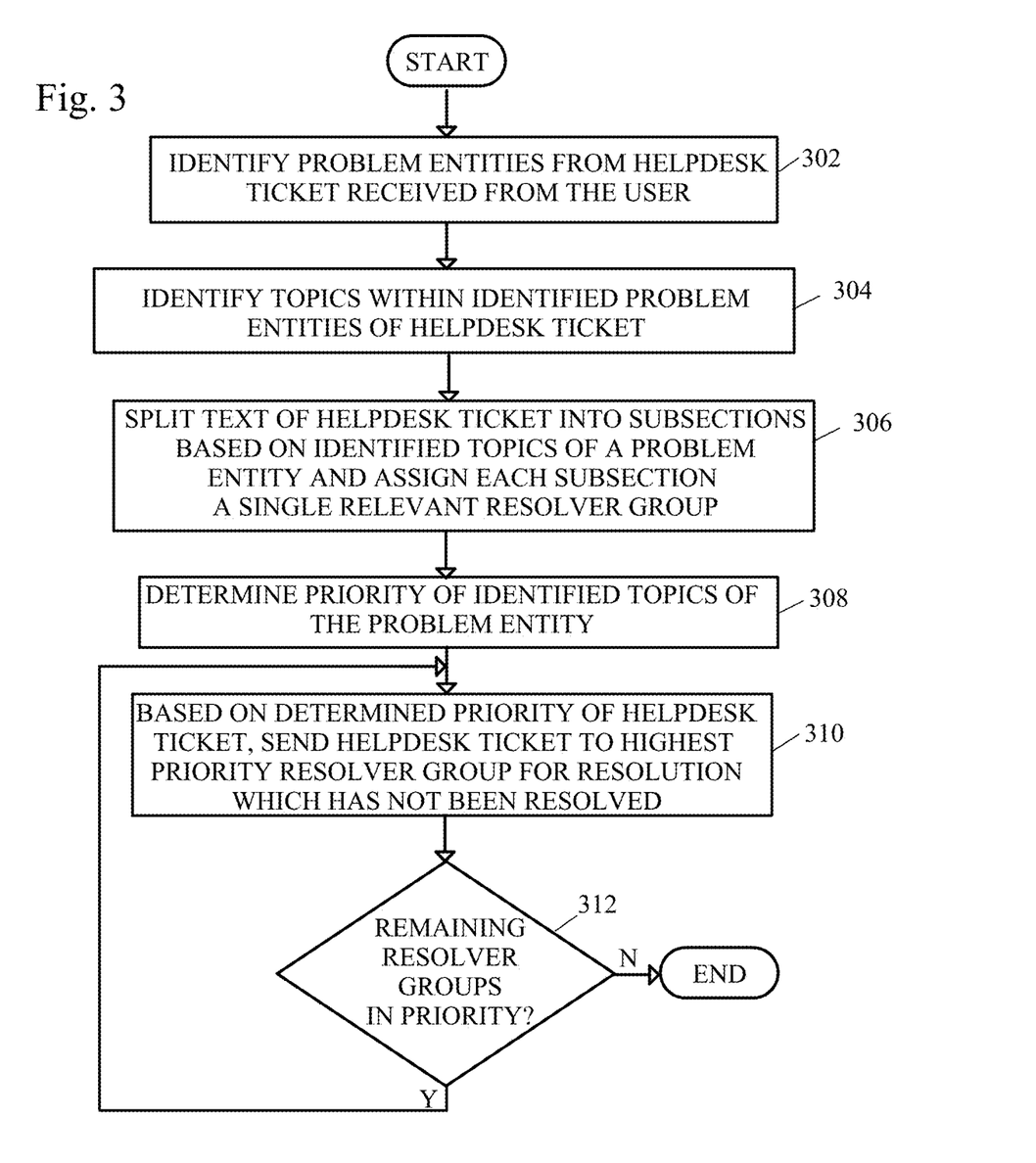
FIG. 3 shows a flow diagram of a method of resolving helpdesk tickets requiring resolutions from multiple groups.

Referring to FIG. 3, in a first step (step 302) problem entities from a helpdesk ticket received from a user are identified, for example by the helpdesk management system 96. The problem entities are preferably identified from text present within the helpdesk ticket. While the examples shown refer to an e-mail received, the text can be present in other electronic messages or formats, which includes, but is not limited to SMS message, plain text files, computer generated or transcribed messages.

The text may include, but is not limited to identification of a sender or user, subject, receiver, part of a conversation, or any other part of the electronic e-mail message including, but not limited to attachments of the electronic message, header information, subject information, and text in a body of the message.

The problem entities identified can include, but are not limited to, one or a combination of symptoms, topics, actions, intent or any other identifier associated with a problem the user is having relative to a system.

Problem entities are mined from the text of an electronic message using an entity extraction module of the helpdesk management system 96. The entity extraction module is trained on text from the actual electronic messages as well as resolution steps of historical resolved helpdesk tickets and audit logs with the same or variations on the same or similar problem entities. The resolution steps of historically resolved helpdesk tickets are used for training, since resolution strategy mentioned in the historically resolved helpdesk tickets are less noisy or verbose than the actual conversations, or text present in electronic messages, such as email text, and the extraction will be more accurate and will result in clean problem entities. Furthermore, since the resolution steps correspond to at least some of the problems in the current helpdesk ticket message, consideration of previous resolutions aids in identifying the relevant portions of the helpdesk ticket message, especially if the message is noisy. This same information can also be obtained from audit logs (if available). Furthermore, training of the entity extraction module can be enriched by the generation of variations of helpdesk ticket messages data using text from the resolution steps of historical helpdesk tickets.

Next, topics are identified within the identified problem entities within the text of the helpdesk ticket message (step 304), for example by the helpdesk ticket management system 96 through natural language processing discussed in further detail below.

The text of the helpdesk ticket message is split into subsections based on identified topics of a problem entity and each subsection is assigned to a single relevant resolver group (step 306), for example by the helpdesk ticket management system 96. Each identified topic of an identified problem entity found is related to a particular problem pertaining to a single resolver group. Similar topics are commonly found together in one or more problem identities and can be associated with the same resolver group. For increased accuracy, topics can additionally be inferred from the resolution steps of the resolved helpdesk tickets with the same identified topics. Classifiers, based on historical tickets, can also be used to assign a single relevant resolver group for each subsection.

Detection of topic changes within the text of the e-mail can be determined through topic modeling, sentiment analysis through detection of tone changes, sentence and paragraph boundary detection through natural language processing, spatial vicinity of related problem entities or problem entities which usually occur in the same topic and/or whose resolution strategy is similar or the same, or other analysis. The boundaries between two different topics can be finetuned or further distinguished through additional sentiment analysis and segment detection. The topic modeling used, can be, but is not limited to a Latent Dirichlet Allocation to model shifts in topics and apply a change point detection algorithm to detect when significant changes happen.

Figure 5:
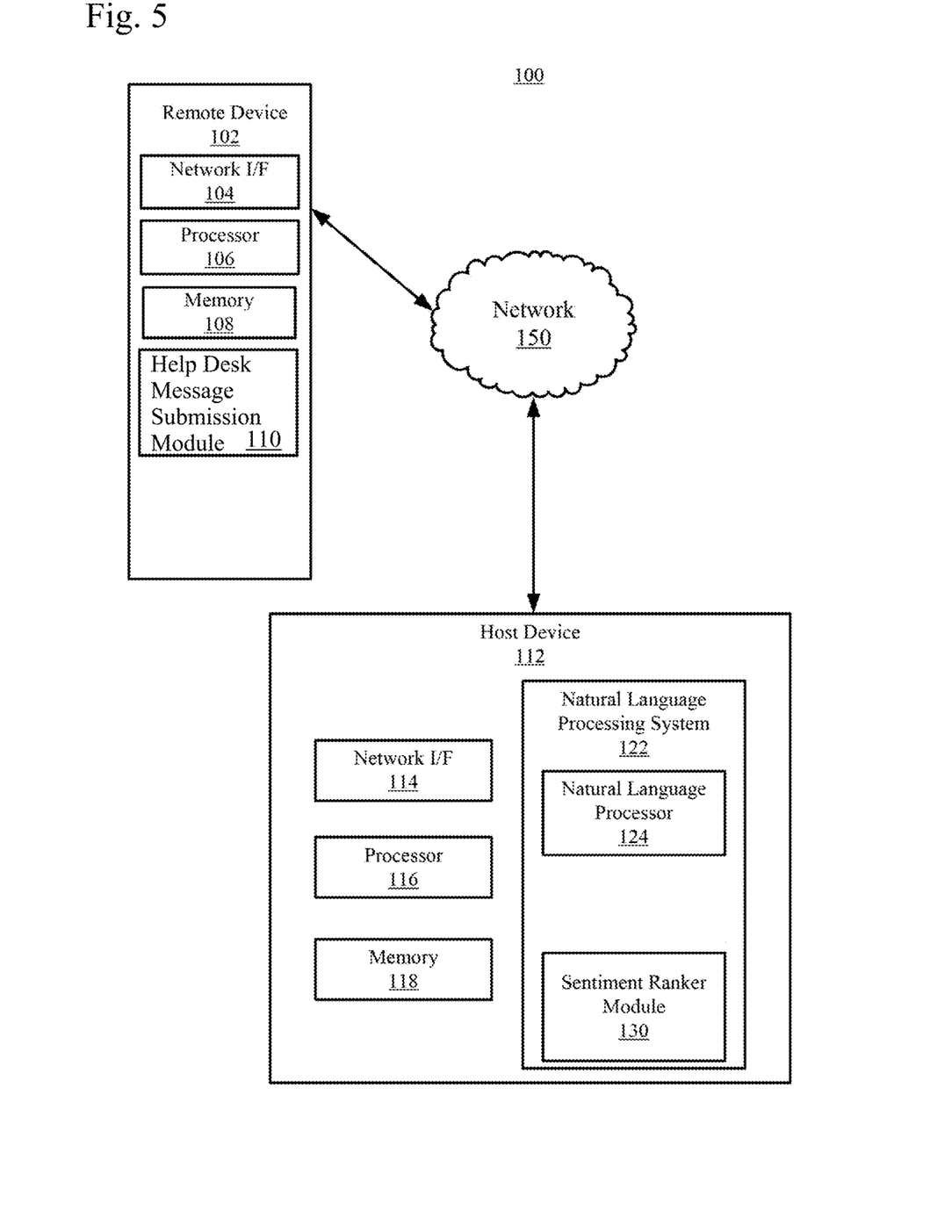
FIG. 5 illustrates a block diagram of an example computing environment in which illustrative embodiments of the present disclosure may be implemented.

As discussed above, aspects of the disclosure may relate to natural language processing. Accordingly, an understanding of the embodiments of the present disclosure may be aided by describing embodiments of natural language processing systems and the environments in which these systems may operate. Turning now to the figures, FIG. 5 illustrates a block diagram of an example computing environment 100 in which illustrative embodiments of the present disclosure may be implemented. While not shown, the computing environment 100 may be one of the computing nodes 10 and incorporated within the cloud computing environment. Alternatively, the computing environment 100 is in communication with the cloud computing environment 50 over any type of network and/or network addressable connection. In some embodiments, the computing environment 100 may include a remote device 102 and a host device 112.

Consistent with various embodiments, the remote device 102 and the host device 112 may be computer systems. The remote device 102 and the host device 112 may include one or more processors 106 and 116 and one or more memories 108 and 118, respectively. The remote device 102 and the host device 112 may be configured to communicate with each other through an internal or external network interface 104 and 114. The network interfaces 104 and 114 may be, for example, modems or network interface cards. The remote device 102 and/or the host device 112 may be equipped with a display or monitor. Additionally, the remote device 102 and/or the host device 112 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.).

In some embodiments, the remote device 102 and/or the host device 112 may be servers, desktops, laptops, or hand-held devices.

The remote device 102 and the host device 112 may be distant from each other and communicate over a network 150. In some embodiments, the host device 112 may be a central hub from which remote device 102 can establish a communication connection, such as in a client-server networking model. Alternatively, the host device 112 and remote device 102 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote device 102 and the host device 112 may be local to each other and communicate via any appropriate local communication medium. For example, the remote device 102 and the host device 112 may communicate using a local area network (LAN), one or more hardwire connections, a wireless link or router, or an intranet. In some embodiments, the remote device 102 and the host device 112 may be communicatively coupled using a combination of one or more networks and/or one or more local connections. For example, the first remote device 102 may be hardwired to the host device 112 (e.g., connected with an Ethernet cable) while a second remote device (not shown) may communicate with the host device using the network 150 (e.g., over the Internet).

In one embodiments, the network 150 can be implemented within a cloud computing environment 50 as shown in FIGS. 1-2, or using one or more cloud computing services. Consistent with various embodiments, a cloud computing environment 50 may include a network-based, distributed data processing system that provides one or more cloud computing services. Further, a cloud computing environment 50 may include many computers (e.g., hundreds or thousands of computers or more) disposed within one or more data centers and configured to share resources over the network 150. The computing devices 54A-N as shown in FIG. 1 can be the remote device 102 and host device 112.

In some embodiments, the remote device 102 may enable users to submit electronic messages which are helpdesk tickets that contain problem entities for resolution to the host devices 112 in order to have the text ingested and analyzed for sentiment (e.g., by natural language processing system 122). For example, the remote device 102 may include a helpdesk message submission module or an e-mail service 110 and a user interface (UI). The helpdesk message submission module 110 may be in the form of a web browser or any other suitable software module, and the UI may be any type of interface (e.g., command line prompts, menu screens, graphical user interfaces). The UI may allow a user to interact with the remote device 102 to submit, using the helpdesk message submission module 110, one or more electronic messages containing text regarding problems to the host device 112.

In some embodiments, the host device 112 may include a natural language processing system 122. The natural language processing system 122 may include a natural language processor 124, a rank notifier 126, and a sentiment ranker module 130. The natural language processor 124 may include numerous subcomponents, such as a tokenizer, a part-of-speech (POS) tagger, a semantic relationship identifier, and a syntactic relationship identifier. An example natural language processor is discussed in more detail in reference to FIG. 6.

In some embodiments, the sentiment ranker module 130 may be configured to rank identified topics of a problem entity as discussed in further detail below based on an analysis of the sentiment associated with ingested and annotated helpdesk ticket messages.

In some embodiments, the natural language processing system 122 may further include a search application (not shown). The search application may be implemented using a conventional or other search engine, and may be distributed across multiple computer systems. The search application may be configured to search one or more databases or other computer systems for audit logs or historically resolved helpdesk tickets. For example, the search application may be configured to search a corpus of information related to resolved helpdesk tickets and/or audit logs associated with problem entities previously submitted by the helpdesk message submission module 110 in order to identify additional relevant resolutions and helpdesk tickets.

While FIG. 5 illustrates a computing environment 100 with a single host device 112 and a single remote device 102, suitable computing environments for implementing embodiments of this disclosure may include any number of remote devices and host devices. The various modules, systems, and components illustrated in FIG. 5 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to ingest and annotate helpdesk ticket messages, and the second host device may include a software module configured to compare and rank identified problem entities based on the ingested helpdesk ticket messages.

It is noted that FIG. 5 is intended to depict the representative major components of an exemplary computing environment 100. In some embodiments, however, individual components may have greater or lesser complexity than as represented in FIG. 5, components other than or in addition to those shown in FIG. 5 may be present, and the number, type, and configuration of such components may vary.

Figure 6:
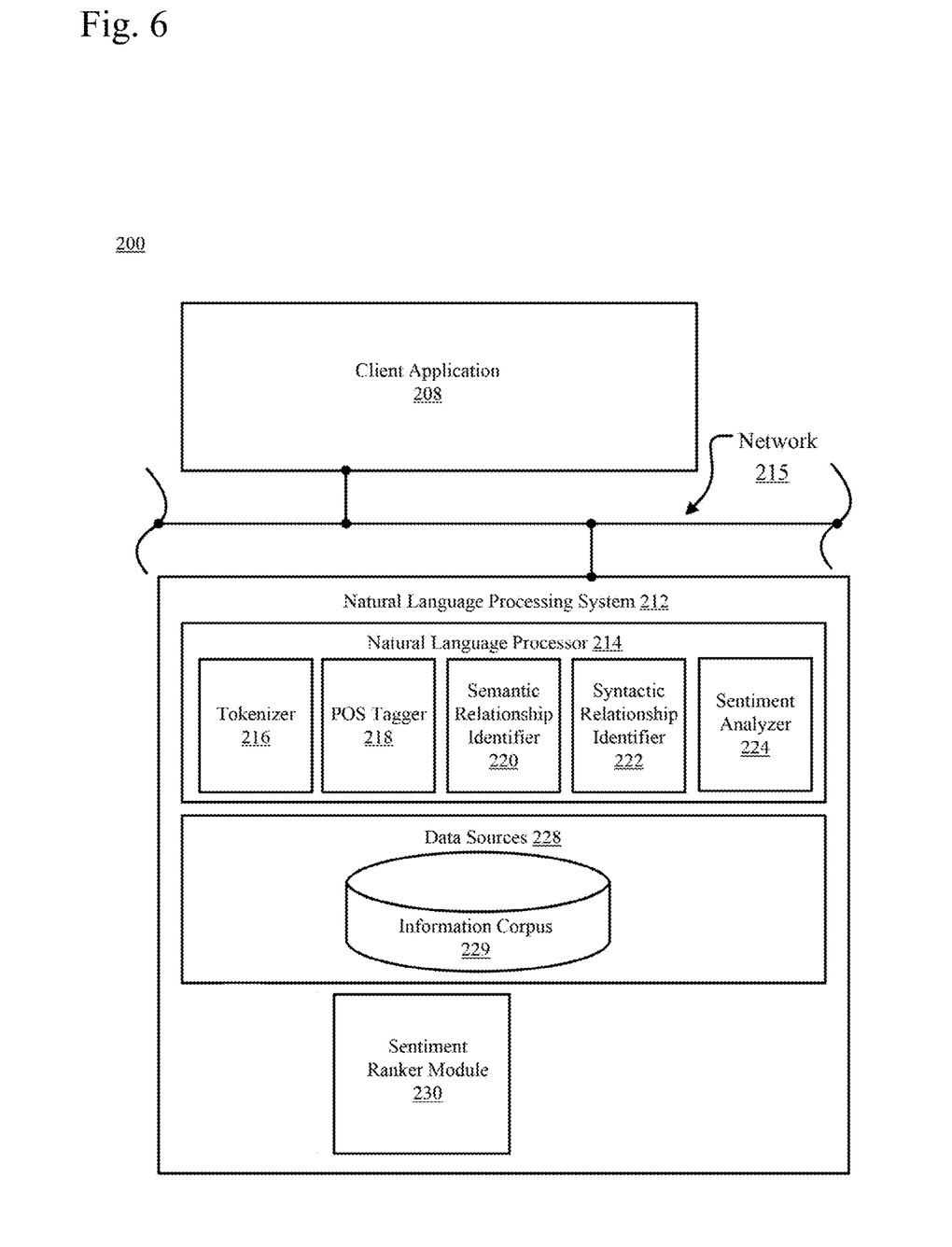
FIG. 6 illustrates a block diagram of an exemplary system architecture, including a natural language processing system, configured to use helpdesk tickets to identify problem entities, in accordance with embodiments of the present disclosure.

Referring now to FIG. 6, shown is a block diagram of an exemplary system architecture 200, including a natural language processing system 212, configured to use helpdesk ticket messages to identify and prioritize problem entities, in accordance with embodiments of the present disclosure. In some embodiments, a remote device (such as remote device 102 of FIG. 5) may submit electronic documents or messages (containing text to be analyzed) to the natural language processing system 212 which may be housed on a host device (such as host device 112 of FIG. 5). Such a remote device may include a client application 208, which may itself involve one or more entities operable to generate or modify information in the helpdesk ticket messages that are then dispatched to a natural language processing system 212 via a network 215.

Consistent with various embodiments, the natural language processing system 212 may respond to electronic document submissions sent by the client application 208. Specifically, the natural language processing system 212 may analyze a received helpdesk ticket message to aid in the analysis of the relative importance of helpdesk problems for resolution. In some embodiments, the natural language processing system 212 may include a natural language processor 214, data sources 228, and a sentiment ranker module 230.

The natural language processor 214 may be a computer module that analyzes the received helpdesk ticket messages and other electronic documents. The natural language processor 214 may perform various methods and techniques for analyzing electronic documents (e.g., syntactic analysis, semantic analysis, etc.). The natural language processor 214 may be configured to recognize and analyze any number of natural languages. In some embodiments, the natural language processor 214 may parse passages of the documents. Further, the natural language processor 214 may include various modules to perform analyses of helpdesk ticket messages. These modules may include, but are not limited to, a tokenizer 216, a part-of-speech (POS) tagger 218, a semantic relationship identifier 220, a syntactic relationship identifier 222, and sentiment analyzer 224.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds to based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of a helpdesk ticket message may shed light on the meaning of text elements in another helpdesk ticket message, particularly if they both include similar identified problem entities). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by other components of the natural language processing system 212.

In some embodiments, the semantic relationship identifier 220 may be a computer module that is configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that is configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

Consistent with various embodiments, the sentiment analyzer 224 may be a computer module that is configured to identify and categorize the sentiments associated with tokens of interest. In some embodiments, the sentiment analyzer may be configured to identify, within text passages, and annotate keywords that are preselected by an administrator or present in resolved historical tickets as high quality indicators of sentiment polarity (e.g., indicators of positive sentiment could include brilliant, excellent, or fantastic). Various tools and algorithms may be used by the sentiment analyzer 224 as are known to those skilled in the art (e.g., Naïve Bayes lexical model).

In some embodiments, the natural language processor 214 may be a computer module that may parse a document and generate corresponding data structures for one or more portions of the document. For example, in response to receiving a helpdesk ticket message at the natural language processing system 212, the natural language processor 214 may output parsed text elements from the message as data structures. In some embodiments, a parsed text element may be represented in the form of a parse tree or other graph structure. To generate the parsed text element, the natural language processor 214 may trigger computer modules 216-224.

In some embodiments, the output of the natural language processor 214 may be stored as an information corpus 229 in one or more data sources 228. In some embodiments, data sources 228 may include data warehouses, information corpora, data models, and document repositories. The information corpus 229 may enable data storage and retrieval. In some embodiments, the information corpus 229 may be a storage mechanism that houses a standardized, consistent, clean, and integrated copy of the ingested and parsed product reviews. Data stored in the information corpus 229 may be structured in a way to specifically address analytic requirements. For example, the information corpus 229 may store the ingested helpdesk ticket messages based on groups of related problem entities (e.g., problems or topics of the same type) in order to make ranking problem entities or topics easier. In some embodiments, the information corpus 229 may be a relational database.

In some embodiments, the natural language processing system 212 may include a sentiment ranker module 230. The sentiment ranker module 230 may be a computer module that is configured to generate sentiment scores for specific topics of a problem entities based on the analysis of annotated product reviews. The sentiment ranker module 230 may be further configured to rank the specific topics based on these sentiment scores.

Figure 4:
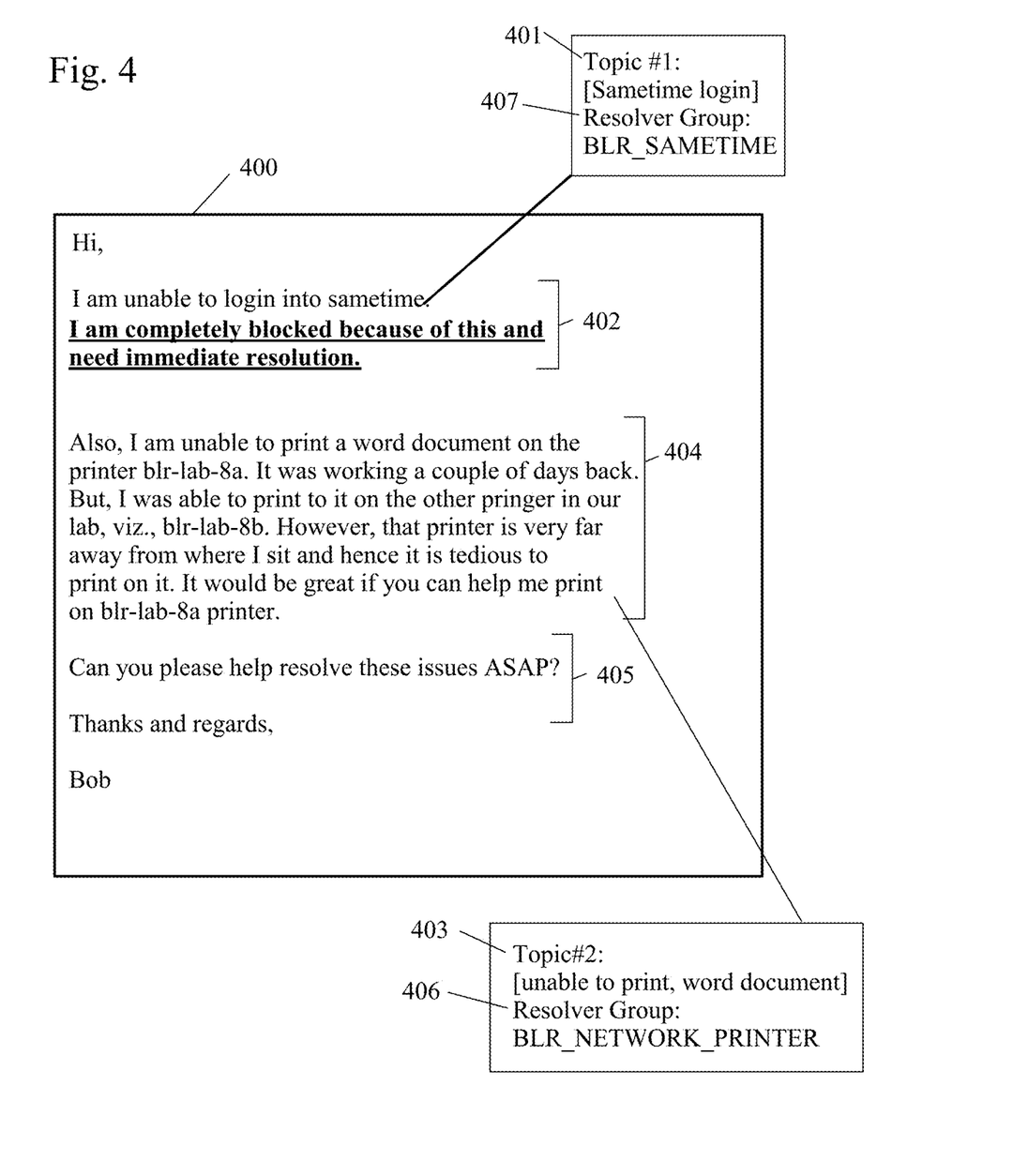
FIG. 4 shows an example of a helpdesk ticket e-mail with multiple problems.

Referring to FIG. 4, an example of a helpdesk ticket message in the form of an e-mail 400 is shown. A first topic 401 of "Sametime Login" is identified from the context of the text of the e-mail in a first paragraph 402. A second topic 403 of "unable to print" is determined by sentiment analysis and context of the text in a second paragraph 404. A helpdesk issue was not determined as being present in the third paragraph 405 based on identified context. Every resolver group handles a specific list of problem categories (each topic). The identified topics (or email segments containing each identified topic) are assigned to resolver groups using a traditional CAE which uses a classifier trained on historical tickets.

A first topic 401 of "Sametime Login" is assigned to a resolver group of "BLR_SAMETIME" and the second topic 403 of "unable to print" is assigned to a resolver group of "BLR_NETWORK PRINTER". The resolver group is found using a classifier model (CAE) trained on historical tickets. Each segment of the ticket discusses a distinct problem. Once the segments are identified CAE is applied to each of the segments to understand the resolver group.

It should be noted that in the above example, a traditional CAE system would only provide one resolver group based on a confidence level. For example, the traditional CAE system would suggest a resolver group 406 of "BLR_NETWORK_PRINTER" as a significant portion of the e-mail discusses this issue, however, the critical problem identified by the user is not being able to login to SameTime and hence the "BLR_SAMETIME" should be predicted as at least one of the resolver groups. Alternatively, the traditional CAE system would identify the SameTime login issue and fail to recognize the printing issue.

Next, a priority of the identified topics of the problem entity are determined using sentiment analysis and classifier training based on historically resolved helpdesk tickets (step 308). The priority of the problems identified and their associated resolver groups, and therefore the ordering of the problems identified based on priority, are determined using information mined from the electronic message text (at runtime) as well as from information offline, such as from historical helpdesk tickets and audit logs.

A combination of four different sequencing/prioritization techniques are preferably used to determine a final order of application of the resolver groups in order to resolve problem entities within the helpdesk ticket messages. The different sequencing/prioritization techniques used may be natural sequence of problem resolution (if any) mined from audit logs or ticket assignment history; user defined priority inferred from the email ticket at runtime; CAE system predicted priority or severity of the individual problems; and sequence inferred from email text.

In one embodiment, it is preferable that the sequencing/prioritization techniques are preferably used to determine a final order of application of the resolver groups to the helpdesk ticket messages and are applied in the following order; with the first technique being the/a natural sequence of problem resolution (if any) mined from audit logs or ticket assignment history, the second technique being user defined priority inferred from the email ticket at runtime; the third technique being CAE system predicted priority or severity of the individual problems; and the fourth technique being sequence inferred from email text.

In an alternate embodiment, one or more of the sequencing/prioritization techniques can be applied in any order.

In some cases there is a natural sequence in problem resolution between different problems. For example, in an example helpdesk ticket e-mail containing the following text (resolver groups are annotated in the example below for clarification, but would not be assigned by the user):

Hi,
My billing for this month is incorrect—can you please check? (RESOLVER GROUP A)
Also, the address mentioned in my bill is incorrect. Please resolve this as well. (RESOLVER GROUP B)
Thanks for your help.
Bill In the above example, the billing cannot be corrected until the billing address is corrected, therefore, Resolver Group A depends on Resolver Group B and even though the user requested Resolver Group A first, Resolver Group B has to occur in order for Resolver Group A to be effective. Therefore, the higher priority would be given to Resolver Group B, followed by Resolver Group A, irrespective of the user request.

Natural sequence rules can be learned by the system by mining historical audit logs of the ticketing system. By mining the historical ticket assignment process from audit logs and running sequence mining techniques, natural interdependence between resolver groups can be used to appropriately determine the order in which resolver groups need to be executed for resolution of the helpdesk tickets. The natural sequence rules can be determined through a dependency graph extraction.

In some cases, the user implicitly or explicitly specifies the priority of the tasks. If the priority is explicitly specified, the priority can be obtained through natural language processing techniques. It should be noted that while this is determined, as shown above, the user specified priority does not take precedence.

For example, a helpdesk ticket e-mail may contain two problem entities, one problem entity of which has a higher severity than the other problem entity and may lead to escalation. In such cases, the more severe problem entity would need to be resolved first. If the priority is implicitly specified using strong or highly critical words for one problem entity and relatively weaker or less critical words for the other problem entity, the priority can be determined using sentiment analysis. For example, the subsections of the text of the helpdesk ticket message are extracted and sentiment analysis is applied to each subsection to determine a sentiment score. The higher the sentiment score, the more sentiment expressed by the user. The subsections with the highest sentiment score determines the priority of the resolver groups associated with each of the subsections of the helpdesk ticket e-mail. For example:

Hi,
MY SYSTEM IS DEAD DUE TO BATTERY ISSUE AND NEEDS IMMEDIATE ATTENTION AS I AM IN A CLIENT LOCATION WITH HIGH CRITICAL DELIVERY. Also, please help me resolve the past server log caching issue which is raised.
Bob In the above example, the bolded, capitalized text would have a higher negative sentiment score in comparison to the rest of the helpdesk ticket text.

In an alternate embodiment, priority can be determined by specific text characteristics. For example, a user may use text characteristics such as bold text, italic text, underlined text, text with an increased font size, text in different colors to denote a higher priority. See for example the bolded text in the first paragraph 402 of the helpdesk ticket e-mail shown in FIG. 4. In this example, the resolver group of "BLR_SAMETIME" would be given a high priority than "BLR_NETWORK_PRINTER".

In helpdesk ticket messages in which a user does not specify a priority (implicitly or explicitly), CAE systems are used to determine a priority. A CAE system searches for and identifies historical helpdesk ticket messages with similar problem entities which have already been resolved and determines the severities or priorities assigned for each problem identity and the associated resolver group. The historical helpdesk ticket messages are then used to train the CAE system to predict the priority or severity of the identified problem identifies of the current helpdesk ticket message.

Therefore, the CAE systems, based on historical resolved helpdesk ticket messages, can assign priorities to the sub-sections or topics of the problem identities.

If the above techniques do not yield a sequence, or a priority sequence is not applied, and a sequence based on the order of in which the problem identities need to be solved are present in the helpdesk ticket message will be applied. If the order within the helpdesk ticket message is additionally inconclusive, the problem identities are assigned to the resolver groups simultaneously. For example, if helpdesk ticket included the following text:

Hi.
Please help me resolve the battery problem. Also please resolve the caching issues in the server.
Bill In the above helpdesk ticket, the batter problem would be assigned to a different resolver group than the caching issues in the server. No ordering is provided within the message as to which needs to be solved first.

Based on the determined priority or sequence, the helpdesk ticket message is sent to the highest priority resolver group for resolution of a problem entity which has not yet been resolved (step 310).

After resolution of a resolver group, if it is determined that another resolver group associated with a topic remains in the determined priority (step 312), then the method returns to step 310 and a/the helpdesk ticket is sent to the next highest priority resolver group for resolution (step 314). The method ends when all of the problem entities and have been sent to their associated resolver groups. It should be noted that the helpdesk ticket message may be sent to the resolver groups via e-mail.

In one embodiment of the present invention, resolution and pipelining of helpdesk ticket e-mails needing resolutions from multiple groups using a method of email segment partitioning and matching each segment to suitable problem and resolver group and then sequencing the partitioned segments based on sentiment analysis and sequence mining on historical tickets and audit logs is executing within the following steps of: identifying problem entities in email; splitting the problem space in the email based on topic modeling; assigning the sub-parts to the relevant resolver group; determining the priority of the problems using sentiment analysis and classifier trained on historical tickets; and determining the sequence in which problems need to be resolved by sequence mining on historical tickets and audit logs.

It should be noted that attachments of helpdesk ticket e-mails can also be utilized by the system to determine a single relevant resolver group and the associated priority. Once a topic has been assigned to the attachment, relevant attachments can be included with determined topic and sent to the single resolver group for resolution.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of resolving helpdesk ticket messages received electronically by a computer, in which a single helpdesk ticket message requires resolutions from multiple resolver groups, the method comprising the computer executing program instructions of:
    identifying at least two problem entities from within text of the single helpdesk ticket message received from a user;
    identifying topics within each of the at least two identified problem entities from within the text of the single helpdesk ticket message, said identifying topics identifying at least two topics within the single helpdesk ticket message;
    parsing the text of the single helpdesk ticket message into subsections based on the identified topics of the at least two identified problem entities;
    assigning each subsection of text of the single helpdesk ticket message to a single relevant resolver group, wherein at least a first single relevant resolver group assigned to one subsection of text is different than at least a second single relevant group assigned to another subsection of text of the single helpdesk ticket message;
    determining a priority of each identified topic within the single helpdesk ticket message by ascertaining a sequence of resolver groups sequentially ordered according to a priority of utilizing the resolver groups to resolve the problem entities within the single helpdesk ticket message, said ascertaining the sequence of resolver groups comprising determining a sequence inferred from text of the single helpdesk ticket message based on an interdependencies between resolver groups; and
    based on the priority of each identified topic of the identified topics of the at least two problem entities within the single helpdesk ticket message, sending the single helpdesk ticket to the single relevant resolver group associated with the identified topic with a highest priority.

2. The method of claim 1, wherein said ascertaining the sequence of resolver groups sequentially ordered according to a priority of utilizing the resolver groups to resolve the problem entities within the single helpdesk ticket message further comprises using sentiment analysis and classifier training based on historically resolved helpdesk ticket messages.

3. A computer program product for resolving helpdesk ticket messages, in which a single helpdesk ticket message requires resolutions from multiple resolver groups by a computer comprising at least one processor, one or more memories, one or more computer readable storage media, the computer program product comprising a computer readable storage medium having program instructions embodied therewith, the program instructions executable by the computer to perform a method comprising:
    identifying, by the computer, at least two problem entities from within text of the single helpdesk ticket message received from a user;
    identifying, by the computer, topics within each of the at least two identified problem entities from within the text of the single helpdesk ticket message, said identifying topics identifying at least two topics within the single helpdesk ticket message;
    parsing, by the computer, the text of the single helpdesk ticket message into subsections based on the identified topics of the at least two identified problem entities;
    assigning, by the computer, each subsection of text of the single helpdesk ticket message to a single relevant resolver group, wherein at least a first single relevant resolver group assigned to one subsection of text is different than at least a second single relevant group assigned to another subsection of text of the single helpdesk ticket message;
    determining a priority of each identified topic within the single helpdesk ticket message by ascertaining a sequence of resolver groups sequentially ordered according to a priority of utilizing the resolver groups to resolve the problem entities within the single helpdesk ticket message, said ascertaining the sequence of resolver groups comprising determining a sequence inferred from text of the single helpdesk ticket message based on an interdependencies between resolver groups; and based on the priority of each identified topic of the identified topics of the at least two problem entities within the single helpdesk ticket message, sending, by the computer, the single helpdesk ticket to the single relevant resolver group associated with the identified topic with a highest priority.

4. The computer program product of claim 3, wherein said ascertaining the sequence of resolver groups sequentially ordered according to a priority of utilizing the resolver groups to resolve the problem entities within the single helpdesk ticket message further comprises using sentiment analysis and classifier training based on historically resolved helpdesk ticket messages.

5. A computer system for resolving helpdesk ticket messages, in which a single helpdesk ticket message requires resolutions from multiple resolver groups using a computer comprising at least one processor, one or more memories, one or more computer readable storage media having program instructions executable by the computer to perform the program instructions comprising:

identifying, by the computer, at least two problem entities from within text of the single helpdesk ticket message received from a user;

identifying, by the computer, topics within each of the at least two identified problem entities from within the text of the single helpdesk ticket message, said identifying topics identifying at least two topics within the single helpdesk ticket message;

parsing, by the computer, the text of the single helpdesk ticket message into subsections based on the identified topics of the at least two identified problem entities;

assigning, by the computer, each subsection of text of the single helpdesk ticket message to a single relevant resolver group, wherein at least a first single relevant resolver group assigned to one subsection of text is different than at least a second single relevant group assigned to another subsection of text of the single helpdesk ticket message;

determining a priority of each identified topic within the single helpdesk ticket message by ascertaining a sequence of resolver groups sequentially ordered according to a priority of utilizing the resolver groups to resolve the problem entities within the single helpdesk ticket message, said ascertaining the sequence of resolver groups comprising determining a sequence inferred from text of the single helpdesk ticket message based on an interdependencies between resolver groups; and based on the priority of each identified topic of the identified topics of the at least two problem entities within the single helpdesk ticket message, sending, by the computer, the single helpdesk ticket to the single relevant resolver group associated with the identified topic with a highest priority.

6. The computer system of claim 5, wherein said ascertaining the sequence of resolver groups sequentially ordered according to a priority of utilizing the resolver groups to resolve the problem entities within the single helpdesk ticket message further comprises using sentiment analysis and classifier training based on historically resolved helpdesk ticket messages.

7. The method of claim 1, wherein said ascertaining the sequence of resolver groups further comprises determining a natural sequence of problem resolution mined from audit logs or ticket assignment history.

8. The method of claim 1, wherein said ascertaining the sequence of resolver groups further comprises determining a user defined priority inferred from the single helpdesk ticket message at runtime.

9. The method of claim 1, wherein said ascertaining the sequence of resolver groups further comprises determining a computer-aided engineering system predicted severity of the individual problem entities based on a classifier model trained on historically resolved helpdesk ticket messages.

10. The computer program product of claim 3, wherein said ascertaining the sequence of resolver groups further comprises determining a natural sequence of problem resolution mined from audit logs or ticket assignment history.

11. The computer program product of claim 3, wherein said ascertaining the sequence of resolver groups further comprises determining a user defined priority inferred from the single helpdesk ticket message at runtime.

12. The computer program product of claim 3, said ascertaining the sequence of resolver groups further comprises determining a computer-aided engineering system predicted severity of the individual problem entities based on a classifier model trained on historically resolved helpdesk ticket messages.

13. The computer system of claim 5, wherein said ascertaining the sequence of resolver groups further comprises determining a natural sequence of problem resolution mined from audit logs or ticket assignment history.

14. The computer system of claim 5, wherein said ascertaining the sequence of resolver groups further comprises determining a user defined priority inferred from the single helpdesk ticket message at runtime.

15. The computer system of claim 5, wherein said ascertaining the sequence of resolver groups further comprises determining a computer-aided engineering system predicted severity of the individual problem entities based on a classifier model trained on historically resolved helpdesk ticket messages.

* * * * *